United States Patent
Chang et al.

(10) Patent No.: US 9,699,215 B2
(45) Date of Patent: Jul. 4, 2017

(54) COMPUTER DEVICES AND SECURITY MANAGEMENT DEVICE COMMUNICATIONALLY-CONNECTED TO THE SAME

(71) Applicant: International Business Machines Corporation, Armonk, NY (US)

(72) Inventors: Chiwen Chang, Taipei (TW); Henry H Y. Chuang, Taipei (TW); Jui H. Huang, Taipei (TW); Joey H Y. Tseng, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 14/706,326

(22) Filed: May 7, 2015

(65) Prior Publication Data
US 2015/0350252 A1    Dec. 3, 2015

(30) Foreign Application Priority Data
May 31, 2014  (TW) .............................. 103112029 A (51) Int. Cl.
*H04L 29/06*    (2006.01)

(52) U.S. Cl.
CPC .................................... *H04L 63/20* (2013.01)

(58) Field of Classification Search
CPC ...... H04L 63/20; H04L 63/1416; G06F 9/445
See application file for complete search history.

(56) References Cited

U.S. PATENT DOCUMENTS

| | | | |
|---|---|---|---|
| 6,061,349 A | * | 5/2000 | Coile ................... H01R 31/005 370/389 |
| 7,370,323 B2 | | 5/2008 | Marinelli et al. |
| 7,647,647 B2 | | 1/2010 | Schultz |
| 7,650,638 B1 | | 1/2010 | Njemanze et al. |
| 8,413,134 B2 | | 4/2013 | Celli et al. |

(Continued)

FOREIGN PATENT DOCUMENTS

| | | |
|---|---|---|
| TW | 200836080 A | 9/2008 |
| WO | WO2013/019198 A1 | 2/2013 |
| WO | WO2013019198 A1 | 2/2013 |

OTHER PUBLICATIONS

Xu, Dingbang, and Peng Ning. "Alert correlation through triggering events and common resources." Computer Security Applications Conference, 2004. 20th Annual. IEEE, 2004.*

(Continued)

*Primary Examiner* — Chau Le
*Assistant Examiner* — Muhammad Chaudhry
(74) *Attorney, Agent, or Firm* — Francis Lammes; Stephen J. Walder, Jr.; Jeffrey S. LaBaw (57) ABSTRACT

A mechanism is provided for performing an action on a second computer device. An information receiving unit in a first computer device receives a first message from a security management device, wherein the security management device performs a security analysis. A management program module in the first computer device determines a first action and a first trigger condition according to the security analysis. The management program module sends the first action through a second message to the second computer device via a network instructing the second computer device to perform the first action in response to the first trigger condition being met.

10 Claims, 5 Drawing Sheets

(56) References Cited

U.S. PATENT DOCUMENTS

| | | | |
|---|---|---|---|
| 9,213,564 B1* | 12/2015 | Klein | G06F 9/45533 |
| 2004/0015497 A1 | 1/2004 | Swarna et al. | |
| 2006/0048142 A1* | 3/2006 | Roese | H04L 41/0893 |
| | | | 717/176 |
| 2008/0047018 A1 | 2/2008 | Baudoin et al. | |
| 2009/0299939 A1 | 12/2009 | Jung et al. | |
| 2010/0046553 A1 | 2/2010 | Daigle et al. | |
| 2010/0071054 A1 | 3/2010 | Hart | |
| 2011/0107419 A1 | 5/2011 | Vidal et al. | |
| 2011/0264608 A1 | 10/2011 | Gonsalves et al. | |
| 2013/0246593 A1* | 9/2013 | Bryskin | H04L 41/0893 |
| | | | 709/223 |
| 2013/0343378 A1* | 12/2013 | Veteikis | H04L 49/555 |
| | | | 370/389 |
| 2014/0053226 A1* | 2/2014 | Fadida | H04L 67/34 |
| | | | 726/1 |
| 2014/0165200 A1* | 6/2014 | Singla | G06F 21/56 |
| | | | 726/23 |

OTHER PUBLICATIONS

Fu, Xiaodong, et al. "CANS: Composable, Adaptive Network Services Infrastructure." USITS. 2001.*

Chadha, Ritu, et al. "Policy-based mobile ad hoc network management for DRAMA." Military Communications Conference, 2004. MILCOM 2004. 2004 IEEE. vol. 3. IEEE, 2004.*

Verma, Dinesh C. "Simplifying network administration using policy-based management.", Retrieved from http://ieeexplore.ieee.org/stamp/stamp.jsp?arnumber=993219 , IEEE network 16.2 (2002): 20-26.*

List of IBM Patents or Patent Applications Treated as Related (Appendix P), May 6, 2015, 2 pages.

* cited by examiner

COMPUTER DEVICES AND SECURITY MANAGEMENT DEVICE COMMUNICATIONALLY-CONNECTED TO THE SAME

This application is based on and claims the benefit of priority from Taiwan Patent Application 103112029, filed on May 31, 2014.

BACKGROUND

The present invention generally relates to a computer device, particularly to a security management device communicationally-connected to the computer device. Particularly, the present invention provides the closer interaction between the computer device and the security management device to jointly achieve better security protection.

For network and information security, large enterprises or organizations have been widely adopted security information and event management (SIEM) systems. The SIEM system provides security intelligence, event response, records management, and all kinds of statements by combining events, threat and risk information together according to logs provided by a wide range of computer systems in an internal network system.

For the existing SIEM system, refer to IBM's SECURITY QRADAR® SIEM or HP's ARCSIGHT SECURITY INFORMATION & EVENT MANAGEMENT (SIEM).

For the prior art related to SIEM, refer to, for example, WO 2013019198 or US PUB. 2011/0264608.

SUMMARY

In one illustrative embodiment, a method, in a data processing system, is provided for performing an action on a second computer device. The illustrative embodiment receives, by an information receiving unit in the first computer device, a first message from a security management device, wherein the first message includes performing a security analysis through the security management device. The illustrative embodiment determines, by a management program module in the first computer device, a first action and a first trigger condition corresponding to the first action according to the security analysis. Responsive to the first trigger condition being met, the illustrative embodiment sends, by the management program module, the first action through a second message to the second computer device via a network instructing the second computer device to perform the first action.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system/device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

On one hand, the present invention provides a computer device and a security management device communicationally-connected to the computer device. Particularly, the present invention provides the closer interaction between the computer device and the security management device to jointly achieve better security protection.

First, it is noted herein that the security management device in this specification is sometimes called "SIEM console" or "SIEM Manager" applicable to a computer system, especially a computer system consisting of devices configured through the intranet. The major role of the security management device is to collect logs provided by other computer devices in the computer system to provide system-wide intelligence. On the other hand, the computer device herein is sometimes called "SIEM sensor" or "SIEM agent". The computer devices may be, for example, web server, email server, firewall device, or other network appliance generally with their own main functions to provide information services beyond the security intelligence. The hardware/software resources allocated to the computer devices are mainly used to realize their functions. Only a small amount of the resources are used to support the security management device to generate security intelligence. For example, the computer devices can generate logs when their functions are implemented to record the observed events and return the events to the security management device so that the security management device can provide security intelligence.

In the prior art, when the security intelligence provided by a security management device shows specific security threats, this often relies on manual operations to take care of the other computer device in the computer system (e.g. manual shut-down, reboot, or turning off a specific communication port). Even some of the more advanced security management devices can replace manual operations, and directly issue a command to the computer device, this requires the security management device and the computer device to be tightly bound to support each other (e.g. products all belong to the same vendor), and then the security management device can know the details of the computer device such as the type, model, and actions able to perform, the operation details, and further use the proper scheme or command syntax to control the computer device. However, there are a variety of computer devices in the computer system at a general company. Also, it is possible to have new and different vendor provided computer devices at any time. Therefore, it is difficult and impractical to have the security management device support all computer devices. Another problem in the prior art is that when the security management device issues a command to a computer device, there is no consideration to the current running state of the computer device, that is, there is no consideration to whether the computer device is immediately allowed to perform an action the security management device is requesting.

In view of this, it is an aspect of the present invention that a computer device provides an action list available to be executed to the security management device first, and then the security management device can select the appropriate action which currently and certainly can be performed by the computer device from the list. For example, under normal circumstances, a computer device may perform any of commands such as shut-down, specific programs suspended, and network connection interrupted due to security consideration. However, in some special cases, such as in response to the need for some services, a computer device may not be allowed to be powered off, and only specific programs or network is allowed to be suspended or interrupted. Through the aforementioned action list initiatively provided to the security management device, the security management device can immediately know actions the computer device is currently allowed to perform.

It is another aspect of the present invention that the actions between the computer device and the security management device are communicated through generic action code. The naming and coding of the generic action code are common in all computer devices, and are not specific to a single or specific computer device, and even not limited to vendor-specific products. Each computer device can be managed and operated by mapping the generic action code to the corresponding action script containing action commands and parameters. Therefore, through the generic action code, the security management device no longer needs to know the specific details and command syntax of the computer device.

It is a further aspect of the present invention that when the security management device issues a command to the computer device, it may come with a trigger condition for actions to be executed. This can be applied to the situation where the security management device determines that a security risk is elevated but not yet reached the degree of danger. The advantage of this approach is providing more immediate reaction. Since whether a condition is met can be determined by a computer device (or additional auxiliary device), upon determining that a condition is met, which can be viewed as a risk reaches a threshold, the computer device can perform the corresponding action immediately without reporting to the security management device. This not only increases the efficiency of reaction, but significantly reduces the load of the security management device. In particular, the loading of the security management device is a key factor that will affect the device's ability to fight against the attack when the attack occurs.

Further, in consideration of reducing the load of the security management device, the present invention further provides a security management device which can issue a so-called "spread-style" or "chain reaction type" command and the corresponding trigger condition, so that the subsequent multiple computer devices can perform actions according to the condition preset by the security management device without the security management device involved, as described hereinafter. The security management device can issue a command to the second computer device (or even the third computer device) a command and the corresponding condition to the first computer device, and the first computer device (or other auxiliary device) will determine if the condition is met. Upon determining the condition is met, the first computer device can send a message to the second computer device to ask the second computer device to perform the action, or further ask the second computer device to send a message to a third computer device when another condition is met to ask the third computer device to perform the action. Accordingly, the chain-reaction effect can be achieved. Another approach lies in that the security management device can issue a target and the corresponding condition to the first computer device, and then the first computer device (or other auxiliary device) will determine if the condition is met. Upon determining that the trigger condition is met, the first computer device itself can determine a specific action performed by itself, and (or) send a message to the second computer device and (or) the third computer device to ask the second computer device and (or) the third computer device to perform the action to achieve the target the security management device is requesting.

In addition to the computer device described above, the present invention further includes the aforementioned security management device, and provides a computer program product for the aforementioned computer device and security management device to use.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

Referring now to FIG. 1 through FIG. 3B, computer systems/devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<System Architecture>

Figure 1:
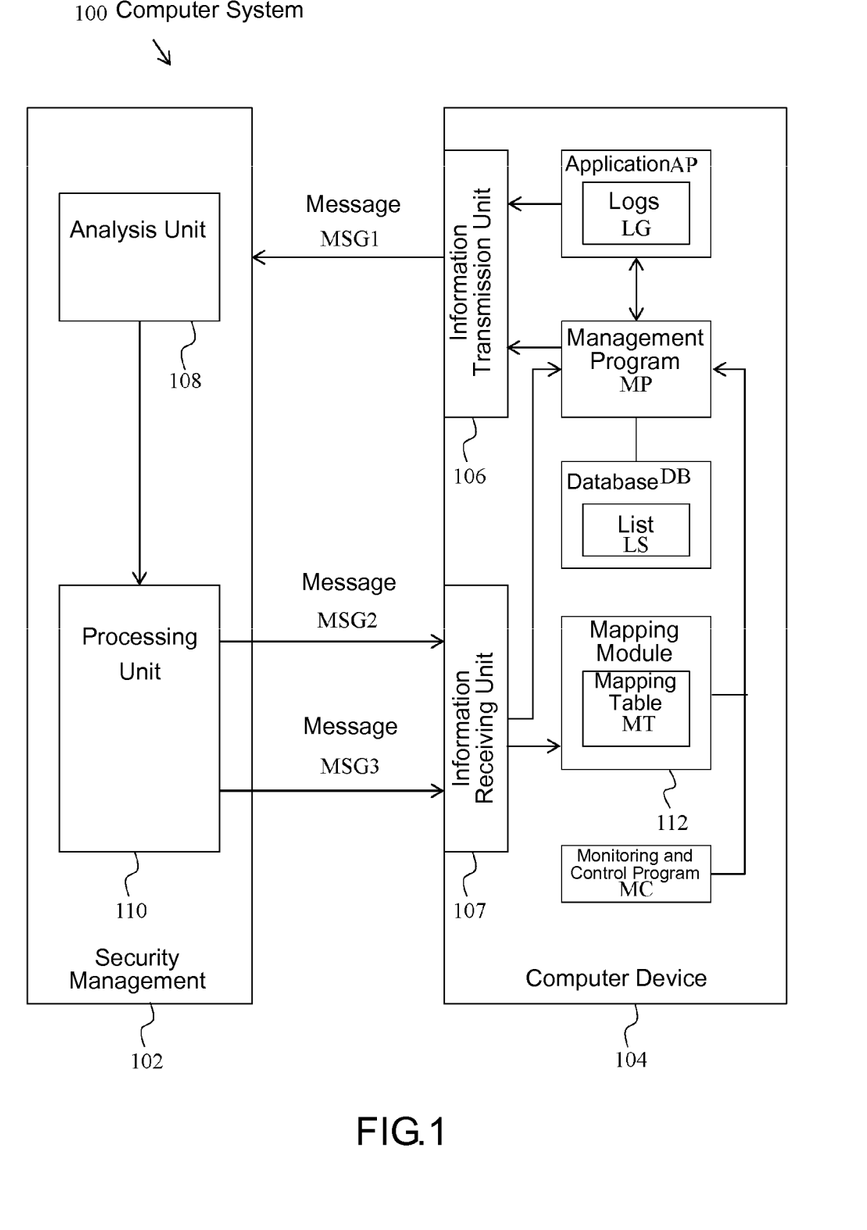
FIG. 1 illustrates a computer system according to a specific embodiment of the present invention.

FIG. 1 illustrates hardware architecture of a computer system 100 according to an embodiment. The computer system 100 includes a security management device 102 and a computer device 104. The security management device 102 is connected to the computer device 104 via a network (not shown); preferably but not limited thereto, the security management device 102 is connected to the computer device 104 via a local area network (LAN). It should be understood that FIG. 1 only illustrates one computer device 104, but this is only for the purpose of simplifying the illustration. The present invention can be extended to more than one of the computer devices 104, and each computer device 104 is a homogeneous or a heterogeneous computer device.

The computer device 104 may be a web server, an email server, a firewall device, or other network appliance which can be connected to an external network (not shown). Therefore, the computer device 104 directly faces security threats from the external network, such as Distributed Denial of Service (DDoS) attacks, but it may also be subject to security threats from the internal network, such as computer viruses.

As shown in FIG. 1, the computer device 104 includes an application AP and a management program MP, and maintains a database DB. The application AP works to provide a major service for the computer device 104. Taking a web server for example, the application AP provides web hosting service (referring to, for example, Apache HTTP Server or IBM HTTP Server applications). Also, in the process of the application AP working to provide services, the application AP will generate logs LG to record events occurred.

The management program MP is preferably, but not limited thereto, executed as an operating systems (such as Linux), through the action as referred to herein, can manage hardware/software operations in the computer device 104, such as power-on/off, turning on/off a specific communications port, and turning on/off a specific program or service. For details about the aforementioned, refer to the existing web servers, email servers, firewall devices, or other network appliances.

The management program MP can know what management actions may be allowed to execute through monitoring the hardware/software operation of the computer device 104. Further, the management program MP records the actions allowed to execute in the moment in the list LS and saves them in the database DB (which may be a module in the management program MP). Also, the management program MP can instantly update the actions recorded in the list LS according to the current hardware/software operation status of the computer device 104, and provide the updated list LS to the security management device 102.

The action list LS and the logs LG generated by the aforementioned application AP can also be combined into a single message MSG1 to be provided to the security management device 102. However, it shall be understood that each of the action list LS and the logs LG can be provided to the security management device 102 respectively. In addition, as shown in FIG. 1, the computer device 104 includes an information transmission unit 106 for sending the logs LG and the list LS or other information to the security management device 102. The information transmission unit 106 may be dedicated to transmitting information to the security management device 102, but can also be used to send other information to another computer device on the web, but the present invention is not intended to be limited thereto.

In a preferred embodiment (but not limited thereto), the management program MP records the action allowed to be executed in the moment with the generic action code. The generic action code may be a generic name or digit, but the naming or coding scheme is not specific to the computer device 104. In other words, different computer devices 104 (e.g. a web server and a firewall device) can share the generic action code, such that the security management device 102 can communicate with all kinds of computer devices 104 through the generic action code.

The following is an example of the list LS in XML format, where the id is a digit and the name is a brief explanatory text (e.g. the target or result to be achieved by this action), but both can be used together with other computer devices 104. Also, in this example, the enabled value "true" or "false" is used to inform the security management device 102 whether this action is allowed to execute now.

```
<?xml version="1.0" encoding="UTF-8"?>
<ActionPool>
    <Action id="1" name="restart system" enabled="true"/>
    <Action id="2" name="restart service" enabled="true"/>
    <Action id="3" name="shutdown service " enabled="false"/>
</ActionPool>
```

On the other hand, as shown in FIG. 1, the security management device 102 includes an analysis unit 108 and a processing unit 110. The analysis unit 108 performs a security analysis according to the logs LG provided by the computer device 104 (or data provided by other computer device) to generate intelligence. Refer to existing security management devices for this part. Further, the processing unit 110 selects a proper action from the list LS according to the intelligence acquired from the security analysis. For example, if the intelligence of the security management device 102 indicates that an abnormal event occurred in the computer device 104, the processing unit 110 selects an action from the list LS in the aforementioned example, e.g. selects the action where the id is "2" and the name is "restart service", and sends a message MSG2 back to the computer device 104 to ask the computer device 104 to restart the application AP and see whether the abnormal event continues to occur. The following is an example of the message MSG2 in XML format.

```
<?xml version="1.0" encoding="UTF-8"?>
<ActionToPerforms>
    <ActionToPerform actionId="2" actionName="restart service"/>
</ActionToPerforms>
```

Furthermore, as shown in FIG. 1, the computer device 104 includes an information receiving unit 107 for receiving a message sent back by the security management device 102. The information receiving unit 107 can be dedicated to receiving information to the security management device 102, but can also be used to receive additional information to other computer devices on the web, but the present invention is not limited thereto.

In this embodiment, since the message MSG2 sent back from the security management device 102 employs the generic action code (actionId="2" actionName="restart service") to record the action the processing unit 110 wants the computer device 104 to perform, the computer device 104 needs to acquire script and relevant details of the actions specified by the code according to the generic action code to correctly perform the action the security management device 102 is requesting. In this regard, the computer device 104 is provided with a mapping module 112 having a mapping table MT. The following is an example of the mapping table MT in XML format. The action code (e.g. actionId="2") in the message MSG1 can be used to find out the corresponding path and parameter of the script (path="/sbin/service" param="httpd restart"/).

```
<?xml version="1.0" encoding="UTF-8"?>
<ActionMapping>
    <Command actionId="1" path="/usr/sbin/shutdown" param="-r now"/>
    <Command actionId="2" path="/sbin/service" param="httpd restart"/>
    <Command actionId="3" path="/sbin/service" param="httpd stop"/>
</ActionMapping>
```

In another embodiment, in accordance with the security intelligence obtained from security analysis, the processing unit 110 not only determines the action the computer device 104 is required to perform, but also sets a trigger condition for whether the computer device 104 needs to perform an action and sends them together back to the computer device 104 through a message MSG3. The following is an example of the message MSG3 in XML format, where the trigger condition is the number of http links per second exceeds 300, and the memory resources used by the application AP (e.g. the Apache HTTP Server) exceeds 80% of total memory resources of the computer device 104. If this condition is met, the action the computer device 104 needs to perform is to restart the application AP.

```
<?xml version="1.0" encoding="UTF-8"?>
<Rule>
    <Conditions>
        <Operator name="AND">
            <Condition name="http.connection" operator="greater" value="300"/>
            <Condition name="http.memory" operator="greater or equal" value="80%"/>
        </Operator>
    </Conditions>
    <ActionToPerform actionId="2" actionName="restart service"/>
</Rule>
```

It should be noted that in the embodiment described above, the computer device 104 may include a monitoring and control program MC (preferably used as a function module under the management program MP) for determining if the condition set by the processing unit 110 is met. However, whether the condition set by the security management device 102 is met may not necessarily be determined by the computer device 104 itself, but may be determined by the device other than the computer device 104, which may then inform the computer device 104.

<Alternative Embodiment 1>

Figure 2A:
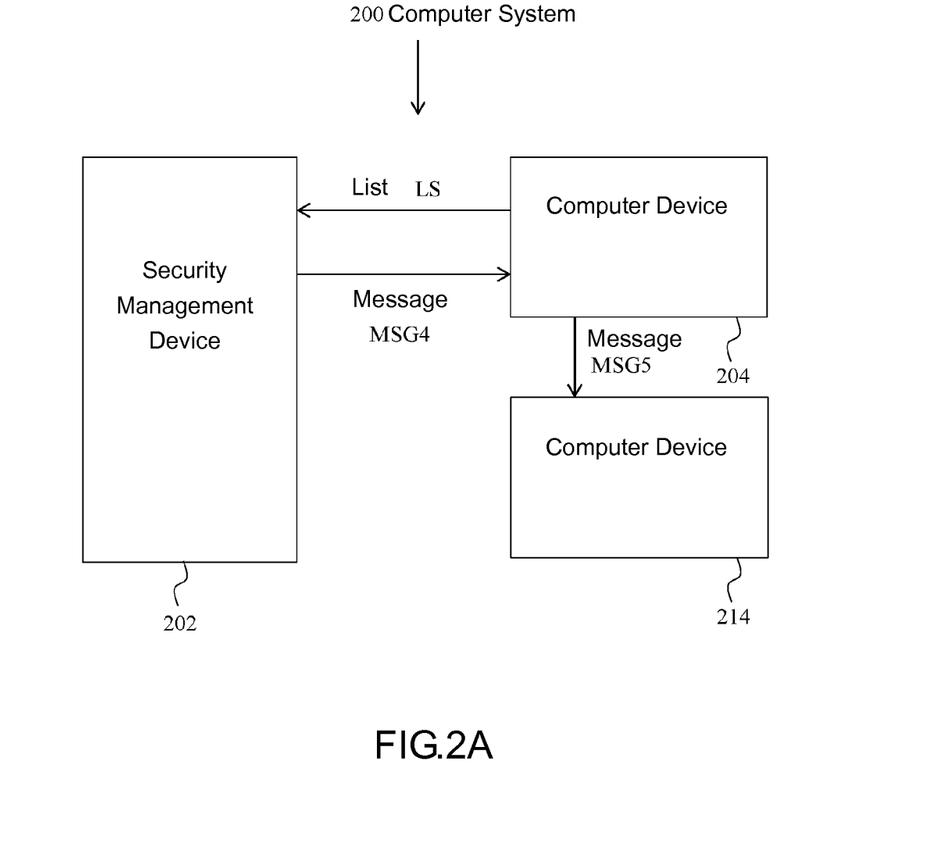
FIG. 2A illustrates a computer system according to a specific embodiment of the present invention.
Figure 2B:
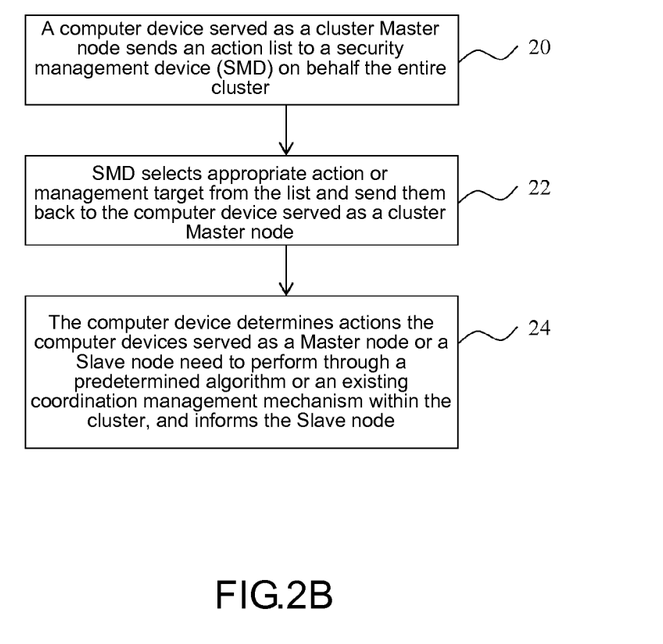
FIG. 2B is a flowchart showing a method according to a specific embodiment of the present invention.

FIG. 2A illustrates a hardware architecture of a computer system 200 according to an embodiment. The present embodiment is described in conjunction with a flowchart as shown in FIG. 2B. The computer system 200 includes a security management device 202 and computer devices 204, 214. The basic illustration of the security management device 202 and the computer device 204, 214 can be found in FIG. 1, and will not be described in detail herein. However, it should be noted that the computer devices 204, 214 in the embodiment in FIG. 2 are homogeneous computer devices and together provide an information service. For example, the computer devices 204 and 214 belong to a web server cluster. However, it should be understood that the web server cluster may contain more computer devices (not shown).

In this cluster, the computer device 204 is served as a Master node, and the computer device 214 and the other computer device in the cluster (not shown) are served as Slave nodes. The computer device 204 served as a Master node can know the operation status of the other Slave node, and thus it is more suitable for the computer device 204 to provide the list LS to the security management device 202 on behalf of the entire cluster (Step 20). Therefore, in this embodiment, the list LS can record an action the cluster-level can perform (e.g. the entire cluster to stop web hosting services) or a management target the cluster-level can achieve (e.g. adjusting the service rate of the entire cluster or http MaxClients allowed to build per second to a specific value). Also, the security management device 202 can select an appropriate action or management target from the list LS according to security analysis and sends it with the message MSG4 back to the computer device 204 served as a cluster Master node (Step 22). The management program MP in the computer device 204 then determines actions each of the computer device 204 and the computer device 214 needs to perform through a predetermined algorithm or an existing coordination management mechanism within the cluster, and informs the computer device 214 through the message MSG5 (Step 24). As to the cluster within the predetermined algorithm or existing coordination and management mechanism, refer to an existing server cluster approach. This will not be described in detail herein.

In a preferred embodiment, but not limited thereto, in addition to determining the appropriate cluster-level action or management target, the security management device 202 can also set a trigger condition and send it back to the computer device 204 through the message MSG4 (Step 22). The following is an example of the message MSG4 in XML format, where the trigger condition is the number of http links of the entire cluster per second exceeds 1,000,000, and the source IP address of http links is "10.3.4.5". If this condition is met, the server cluster needs to reach the entire cluster service ratio to 50% or higher.

```
<?xml version="1.0" encoding="UTF-8"?>
<Rule>
    <Conditions>
        <Operator name="AND">
            <Condition name="cluster.http.connection.sec" operator="greater" value="1000000"/>
            <Condition name="src.ip" operator="equal" value="10.3.4.5"/>
        </Operator>
    </Conditions>
    <ActionToPerform actionName= "maintain cluster service rate at 50% or above"/>
</Rule>
```

It should be noted that the computer device 204 in the aforementioned embodiment may include a monitoring and control program MC (preferably served as a function module under the management program MP), for determining if a condition set by the security management device 202 is met. In general, when served as a Master node, the monitoring and control program MC of the computer device 204 can obtain information returned by the other Slave node to know the operation status of each Slave node. Therefore, it should be more convenient to use the computer device 204 to determine if a cluster-level trigger condition is met. However, it should be understood that the present invention is not intended to be limited thereto.

<Alternative Embodiment 2>

Figure 3A:
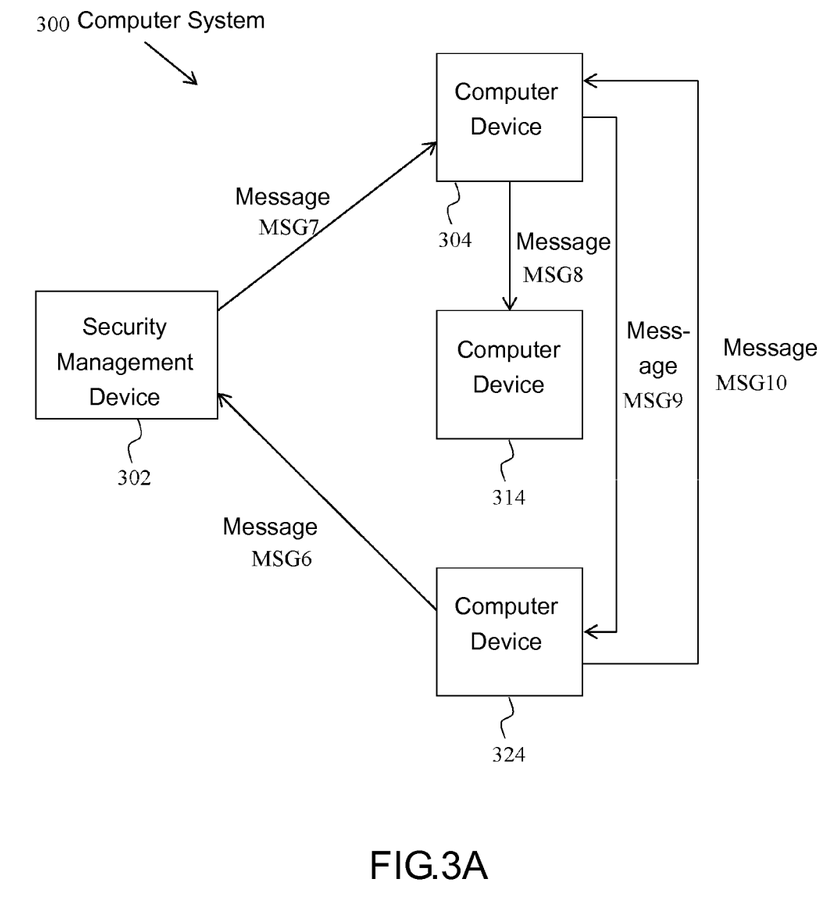
FIG. 3A illustrates a computer system according to a specific embodiment of the present invention.
Figure 3B:
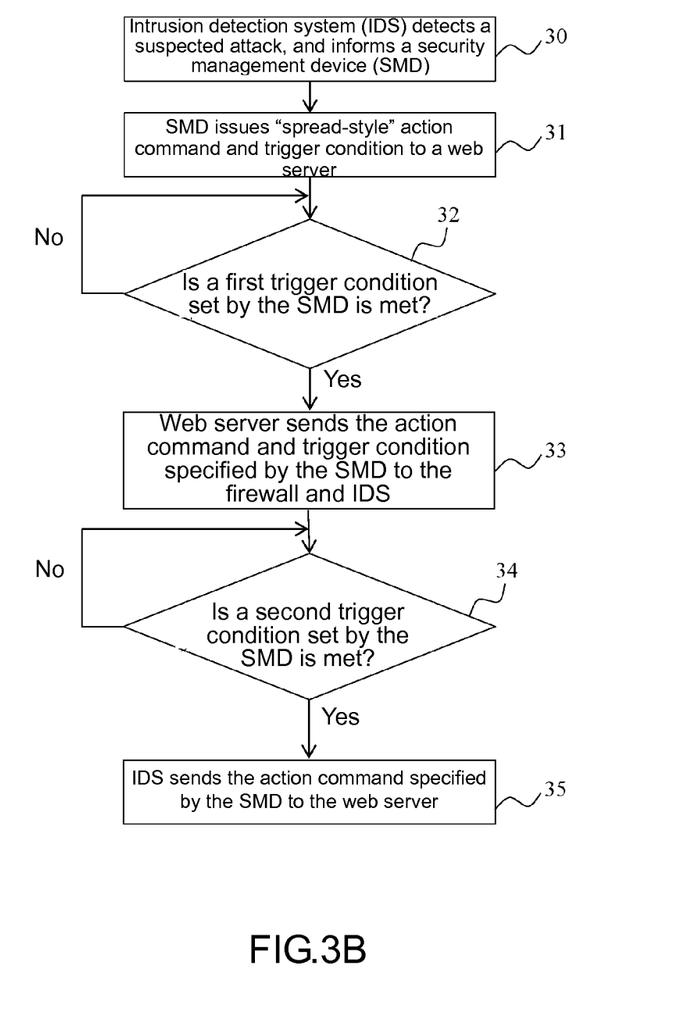
FIG. 3B is a flowchart showing a method according to a specific embodiment of the present invention.

FIG. 3A illustrates a hardware architecture of a computer system 300 according to an embodiment which will be described in conjunction with a flowchart as shown in FIG. 3B. The computer system 300 includes a security management device 302 and computer devices 304, 314, and 324. The basic illustration of the security management device 302 and the computer devices 304, 314, and 324 can be found in FIG. 1 and FIG. 2A, and will not be described in detail herein. However, it should be noted that different from FIG. 2A, the computer devices 304, 314, and 324 in the embodiment as shown in FIG. 3A are heterogeneous computer devices providing different services respectively. For example, the computer device 304 is a web server, the computer device 314 is a firewall device, and the computer device 324 is an intrusion detection system (IDS). However, it should be understood that the computer system 300 may include more different types of computer devices (not shown).

Hereinafter, a hypothetical situation is used to illustrate the present embodiment. The computer device 324 is served as an intrusion detection system (IDS) to detect a suspected but not confirmed DDoS network attack, and informs the security management device 302 with a message MSG6 (Step 30). Refer to the prior art for the relevant description. This will not be described in detail herein. In general, a DDoS network attack target is the computer device 304 which is served as a web server. Thus, the security management device 302 sends a message MSG7 to the computer device 304 to issue a so-called "spread-style" or "chain reaction type" action command and the corresponding trigger condition (Step 31). Thereby the computer device 304 (web server), the computer device 314 (firewall), and the computer device 324 (intrusion detection system (IDS) can coordinate with each other to cope with possible DDoS network attacks without further intervention by the security management device 302. Also, it should be noted that in this embodiment the computer device 304 may be similar to the computer device 204 as shown in FIG. 2A to be a server cluster Master node.

The following is an example of the message MSG7 in XML format where a first trigger condition set by the security management device 302 is that the number of http links of the computer device 304 (web server) per second exceeds 1,000,000, and the source IP address of http link is "10.3.4.5". If the computer device 304 (or other auxiliary devices) determines that the condition is met (Step 32), the management program MP of the computer device 304 needs to perform the following actions.

```
<?xml version="1.0" encoding="UTF-8"?>
<Rule>
    <Conditions>
        <Operator name="AND">
            <Condition name="http.connection.sec" operator="greater" value="1000000"/>
            <Condition name="src.ip" operator="equal" value="10.3.4.5"/>
        </Operator>
    </Conditions>
    <ActionToPerform actionName="stop web service"/>
    <ActionToPropagate>
        <ActionTarget id="Firewall" ip="1.2.3.4">
            <Rule>
                <Conditions>
                    <Condition name="src.ip" operator="equal" value="10.3.4.5"/>
                </Conditions>
                <ActionToPerform actionName="block source ip traffic"/>
            </Rule>
        </ActionTarget>
        <ActionTarget id="IDS" ip="1.2.3.6">
            <Rule>
                <Conditions>
                    <Condition name="src.ip" operator="equal" value="10.3.4.5"/>
                </Conditions>
                <ActionToPerform actionName="block source ip traffic"/>
                <ActionToPropagate>
                    <ActionTarget id="WebServer_01" ip="1.2.6.8">
                        <Rule>
                            <ActionToPerform actionName="restart web service"/>
                        </Rule>
                    </ActionTarget>
                </ActionToPropagate>
            </Rule>
        </ActionTarget>
    </ActionToPropagate>
</Rule>
```

First, the management program MP of the computer device 304 stops web hosting service (which is equivalent to stopping the application AP of computer device 104 as shown in FIG. 1). In the meantime, in response to said first trigger condition is met, the management program MP of the computer device 304 sends or distributes actions and trigger conditions specified by the security management device 302 with the message MSG8 and the message MSG9 to the computer device 314 and the computer device 324 respectively according to the network address of other computer devices (e.g. the computer device 314 and the computer device 324) specified by the security management device 302 in the message MSG7 (Step 33). For the message communication between the computer device 314 and the computer device 324, refer to the message communication between the security management device 302 and the computer device 304.

With further reference to the aforementioned example of the message MSG7 in XML format, for the computer device 314 (a firewall device), the trigger condition set by the security management device 302 in the message MSG7 is that if the source IP address of http links is "10.3.4.5", the computer device 314 determines that the condition is met, and the management program MP of the computer device 314 blocks the IP address of the network communications.

On the other hand, for the computer device 324 (intrusion detection system (IDS)), the trigger condition set by the security management device 302 in the message MSG7 is the same as the one provided to the computer device 314, i.e. if the source IP address is "10.3.4.5", and the computer device 324 determines that the condition is met (Step 34), the management program MP of the computer device 324 first blocks network communication of the IP address. In addition, the management program MP of the computer device 324 further sends or distributes the action specified by the security management device 302 to the next computer device with message MSG10 according to the IP address of the next computer device specified by the security management device 302 in the message MSG7 (Step 35).

In this embodiment, the computer device following the computer device 324 specified by the security management device 302 in the message MSG7 is just the computer device 304, and the action requiring the management program MP of the computer device 304 to perform is restart a web hosting service. However, it should be obvious that the present invention is not limited thereto. Any computer device in the computer system 300 other than the computer device 324 may be used as the next computer device of the computer device 324. In addition, while the security management device 302 only sets the action required to perform for the computer device following the computer device 324 (the computer device 304 in this example) in the message MSG7 and does not add a trigger condition, it should be understood that in other embodiments, a trigger condition can be added to the action the next computer device is required to perform.

Furthermore, it should be noted that in the example described above, the computer devices 304, 314, and 324 may all include a monitoring and control program MC (preferably served as function modules under the management program MP) for determining if a trigger condition set by the security management device 302 is met. The monitoring and control program MC of the computer devices 304, 314, and 324 can further communicate with other computer devices to monitor the operation status of other computer devices and determines if a trigger condition set by the security management device 302 is met. However, it should be understood that whether the aforementioned trigger condition is met may not necessarily be determined by the computer devices 304, 314, and 324 themselves, but may be determined by some other auxiliary devices.

The present invention can be embodied in any other specific manners without departing from the spirit or essential features of the present invention. Every aspect of the aforesaid embodiments of the present invention must be deemed illustrative rather than restrictive of the present invention. Hence, the scope of the present invention is defined by the appended claims instead of the above description. All equivalent meanings and scope which fall within the appended claims must be deemed falling within the scope of the appended claims.

What is claimed is:

1. A method in a first computer device, for performing an action on a second computer device, the method comprising:
    receiving, by an information receiving unit in the first computer device, a first message from a security management device, wherein the security management device performs a security analysis of functions performed by the second computer device, thereby indicating a state of the second computing device, such that a first action and a first trigger condition corresponding to the first action is selected from an available-action list that the second computer device is currently allowed to perform based on the state of the second computer device and wherein the available-action list is a set of actions that can be performed on the second computer device based on the state of the second computer device, wherein the security management device determines address information for the second computer device according to the security analysis and sends the address information of the second computer device through the first message to the first computer device;
    determining, by a management program module in the first computer device, the first action and the first trigger condition corresponding to the first action according to the security analysis in the first message; and
    responsive to identifying the first action in the first message from the security management device and responsive to the first trigger condition being met, sending, by the management program module, the first action through a second message to the second computer device via a network instructing the second computer device to perform the first action, wherein the management program module sends the second message to the second computer device according to the address information of the second computer device in the first message.

2. The method as claimed in claim 1, wherein a monitoring and control program module in the first computing device determines whether the first trigger condition is met.

3. The method as claimed in claim 1, wherein the security management device further determines a second trigger condition corresponding to the first action according to the security analysis of the functions performed by the second computer device and sends the second trigger condition through the first message to the first computer device, and wherein, responsive to the first trigger condition being met, the management program module in the first computing device further sends the second trigger condition through the second message to the second computer device instructing the second computer device to perform the first action when the second trigger condition is met.

4. The method as claimed in claim 1, wherein the security management device generates the first message by the method comprising:
    performing, by an analysis unit in the security management device, the security analysis of the functions performed by the second computer device such that the first action is selected from the available-action list that the second computer device is currently allowed to perform based on the state of the second computer device;
    determining, by a processing unit in the security management device, the first action and the first trigger condition corresponding to the first action for the second computer device according to the security analysis;
    generating, by the processing unit, the first message to record the first action and the first trigger condition; and
    sending, by a transmission unit in the security management device, the first message to the first computer device via the network.

5. A computer program product comprising a non-transitory computer readable storage medium having a computer readable program stored therein, wherein the computer readable program, when executed on a first computing device, causes the first computing device to:
    receive a first message from a security management device, wherein the security management device performs a security analysis of functions performed by a second computer device, thereby indicating a state of the second computing device, such that a first action and a first trigger condition corresponding to the first action is selected from an available-action list that the second computer device is currently allowed to perform based on the state of the second computer device and wherein the available-action list is a set of actions that can be performed on the second computer device based on the state of the second computer device, wherein the security management device determines address information for the second computing device according to the security analysis and sends the address information of the second computing device through the first message to the first computing device;
    determine the first action and the first trigger condition corresponding to the first action according to the security analysis in the first message;
    responsive to identifying the first action in the first message from the security management device and responsive to the first trigger condition being met, send the first action through a second message to a second computing device via a network instructing the second computing device to perform the first action, wherein the computer readable program causes the first computing device to send the second message to the second computing device according to the address information of the second computing device in the first message.

6. The computer program product as claimed in claim 5, wherein the security management device further determines a second trigger condition corresponding to the first action according to the security analysis of the functions performed by the second computer device and sends the second trigger condition through the first message to the first computing device, and wherein, responsive to the first trigger condition being met, the computer readable program causes the first computing device to further send the second trigger condition through the second message to the second computing device instructing the second computing device to perform the first action when the second trigger condition is met.

7. The computer program product as claimed in claim 5, wherein the security management device generates the first message by causing a computer readable program in the security management device to:
perform the security analysis of the functions performed by the second computer device such that the first action is selected from the available-action list that the second computer device is currently allowed to perform based on the state of the second computer device;
determining the first action and the first trigger condition corresponding to the first action for the second computing device according to the security analysis;
generate the first message to record the first action and the first trigger condition; and
send the first message to the first computing device via the network.

8. An apparatus comprising:
a processor; and
a memory coupled to the processor, wherein the memory comprises instructions which, when executed by the processor, cause the processor to:
receive a first message from a security management device, wherein the security management device performs a security analysis of functions performed by a second computer device, thereby indicating a state of the second computing device, such that a first action and a first trigger condition corresponding to the first action is selected from an available-action list that the second computer device is currently allowed to perform based on the state of the second computer device and wherein the available-action list is a set of actions that can be performed on the second computer device based on the state of the second computer device, wherein the security management device determines address information for the second computing device according to the security analysis and sends the address information of the second computing device through the first message to the apparatus;
determine the first action and the first trigger condition corresponding to the first action according to the security analysis in the first message;
responsive to identifying the first action in the first message from the security management device and responsive to the first trigger condition being met, send the first action through a second message to a second computing device via a network instructing the second computing device to perform the first action, wherein the instructions cause the processor to send the second message to the second computing device according to the address information of the second computing device in the first message.

9. The apparatus as claimed in claim 8, wherein the security management device further determines a second trigger condition corresponding to the first action according to the security analysis of the functions performed by the second computer device and sends the second trigger condition through the first message to the apparatus, and wherein, responsive to the first trigger condition being met, the instructions cause the processor to further send the second trigger condition through the second message to the second computing device instructing the second computing device to perform the first action when the second trigger condition is met.

10. The apparatus as claimed in claim 8, wherein the security management device generates the first message by causing instructions in the security management device to cause a processor in the security management device to:
perform the security analysis of the functions performed by the second computer device such that the first action is selected from the available-action list that the second computer device is currently allowed to perform based on the state of the second computer device;
determining the first action and the first trigger condition corresponding to the first action for the second computing device according to the security analysis;
generate the first message to record the first action and the first trigger condition; and
send the first message to the first computing device via the network.

* * * * *